United States Patent [19]
Takagi et al.

[11] Patent Number: 5,246,893
[45] Date of Patent: Sep. 21, 1993

[54] CERAMIC SINTERED BODY AND PROCESS FOR PREPARATION THEREOF

[75] Inventors: Nobuoki Takagi; Hiroki Tokunaga, both of Sendai, Japan

[73] Assignee: Kyocera Corporation, Kyoto, Japan

[21] Appl. No.: 746,192

[22] Filed: Aug. 15, 1991

Related U.S. Application Data

[63] Continuation of Ser. No. 315,518, Feb. 27, 1989, abandoned.

[30] Foreign Application Priority Data

Feb. 29, 1988 [JP] Japan .................... 63-46461

[51] Int. Cl.$^5$ ............................................ C04B 35/56
[52] U.S. Cl. ..................................................... 501/87
[58] Field of Search ........................................ 501/87

[56] References Cited

U.S. PATENT DOCUMENTS

| | | | |
|---|---|---|---|
| 4,356,272 | 10/1982 | Kanemitsu et al. | 501/87 |
| 4,582,812 | 4/1986 | Furukawa et al. | 501/87 |
| 4,598,052 | 7/1986 | Wada et al. | 501/152 |

Primary Examiner—Mark L. Bell
Assistant Examiner—Deborah Jones
Attorney, Agent, or Firm—Spensley Horn Jubas & Lubitz

[57] ABSTRACT

1. Disclosed is a ceramic sintered body comprising, as main components, (a) 60 to 80% by weight of alumina and (b) 20 to 40% by weight of titanium carbide or a combination of titanium carbide and titanium oxide, wherein said ceramic sintered body further comprises (c) 1 to 10 parts by weight, per 100 parts by weight of the sum of the components (a) and (b), of zirconium oxide, at least a part of which is composed of a tetragonal crystal, and (d) 0.4 to 11% by weight, based on the total ceramic sintered body, of a crystal phase of a composite oxide consisting of magnesium oxide and aluminum.

This ceramic sintered body is excellent in the chipping resistance, machinability and surface smoothness, and the ceramic sintered body is suitable as a material of a substrate for a thin film head.

12 Claims, 1 Drawing Sheet

CERAMIC SINTERED BODY AND PROCESS FOR PREPARATION THEREOF

This is a file wrapper continuation of application Ser. No. 07/315,518 filed on Feb. 27, 1989, now abandoned.

BACKGROUND OF THE INVENTION

(1) Field of the Invention

The present invention related to an alumina/titanium carbide ceramic sintered body to be used, for example, as a substrate for a thin film head, and a process for the preparation of this ceramic sintered body.

(2) Description of the Related Art

A thin film head has attracted attention as a high-density recording head that can be used instead of the head formed of ferrite or Sendust, a substrate for this thin film head is required to have a following characteristics:

(1) The abrasion resistance is excellent.
(2) The surface smoothness is excellent.
(3) The chipping resistance is excellent.
(4) The machinability is excellent.

An alumina ($Al_2O_3$)/titanium carbide (TiC) ceramic sintered body attracts attention as the material satisfying these requirements.

When this ceramic sintered body is used, the abrasion characteristic (1) can easily be obtained, but it is difficult to obtain the characteristics (2), (3) and (4).

As the means for improving the machinability of this ceramic sintered body, U.S. Pat. No. 4,582,812 discloses a magnetic head slider comprising a substrate consisting essentially of (a) 100 parts by weight consisting of aluminum oxide and 30 to 50 parts by weight of (TiC+TiO$_2$), and provided that $TiO_2/(TiC+TiO_2) \times 100 = 5$ to 15%, (b) greater than one to 5 parts by weight of a machinability agent which is MgO, NiO, $Cr_2O_3$ or $ZrO_2$, and (c) 0.05 to 2 parts by weight of $Y_2O_3$.

Furthermore, U.S. Pat. No. 4,598,052 discloses an alumina/titanium carbide/titanium oxide sintered body comprising 0.2 to 2 parts of a spinel of magnesium oxide and $Al_2O_3$, 0.2 to 2 parts by weight of zirconium oxide and 0.05 to 2 parts by weight of yttrium oxide.

In the $Al_2O_3$/TiC ceramic sintered body having the above-mentioned structure is improved in the chipping resistance (3) and the machinability (4), but the surface smoothness (2) tends to degrade. Accordingly, in the case where the air bearing surface (ABS) of the substrate is subjected to the mirror polishing, in order to control falling of grains, the mirror polishing conditions should be moderated, and thereof, the polishing quantity per unit time decreases and the mirror polishing time becomes long, with the result that the manufacturing efficiency tends to decrease.

SUMMARY OF THE INVENTION

Under this background, the present invention has been completed. It is a primary object of the present invention to provide an $Al_2O_3$/TiC ceramic sintered body having excellent chipping resistance and machinability and also having good surface smoothness.

Another object of the present invention is to provide an $Al_2O_3$/TiC ceramic sintered body which is suitable as a material of a substrate for a thin film head and is capable of increasing the yield of the thin film head.

More specifically, in accordance with one aspect of the present invention, there is provided a ceramic sintered body comprising, as main components, (a) 60 to 80% by weight of alumina and (b) 20 to 40% by weight of titanium carbide or a combination of titanium carbide and titanium oxide, wherein said ceramic sintered body further comprises (c) 1 to 10 parts by weight, per 100 parts by weight of the sum of the components (a) and (b), of zirconium oxide, at least a part of which is composed of a tetragonal crystal, and (d) 0.4 to 11% by weight, based on the total ceramic sintered body, of a crystal phase of a composite oxide consisting of magnesium oxide and alumina.

In accordance with another aspect of the present invention, there is provided a process for the preparation of a ceramic sintered body, which comprises homogeneously mixing a composition comprising (a) alumina in an amount of 60 to 80% by weight based on the two components (a) and (b), (b) a starting titanium material comprising a combination of titanium carbide titanium oxide in an amount of 20 to 40% by weight based on the two components (a) and (b), the ratio of the titanium oxide to the sum of the titanium carbide and titanium oxide being 8 to 20% by weight, (c') zirconium oxide in the form of a cubic crystal which contains magnesium oxide in the form of a solid solution, and (d') magnesium oxide or a compound capable of forming magnesium oxide under sintering conditions, the amount of zirconium oxide being 1 to 10 parts by weight per 100 parts by weight of the sum of the components (a) and (b) and the amount of magnesium oxide being 0.5 to 6 parts by weight per 100 parts by weight of the sum of the components (a) and (b), molding the mixture into a predetermined shape, and sintering the molded body to transform at least a part of the zirconium oxide in the molded body to a tetragonal crystal and convert the magnesium oxide to a tetragonal crystal and convert the magnesium oxide to a crystal phase of a composite oxide of magnesium oxide and alumina.

Figure 1:
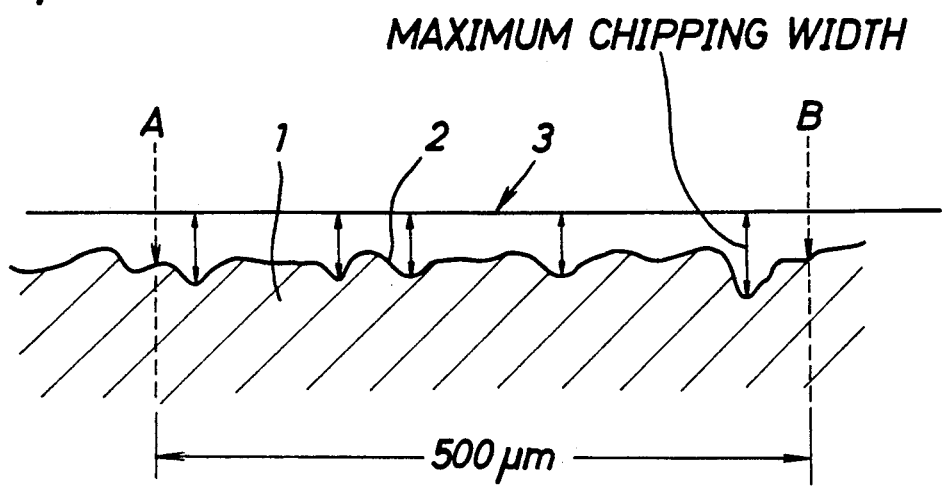
FIG. 1 is a diagram illustrating the section of a sample for measuring the chipping resistance.

In the drawings, reference numeral 1 represents a sample, reference numeral 2 represents the section of the sample, and reference numeral 3 represents the passing interface of a diamond wheel.

DETAILED DESCRIPTION OF THE PREFERRED EMBODIMENTS

The ceramic sintered body of the present invention is characterized in that at least a part, preferably at least 50 mole %, especially preferably at least 70 mole %, of zirconium oxide ($ZrO_2$) is present in the form of a tetragonal crystal and a crystal phase of a composite oxide of zirconium oxide and alumina, especially an MgO $Al_2O_3$ spinel, is present mainly in the grain boundry of the sintered body to promote the toughening effect by $ZrO_2$ particles.

In order to make the spinel of MgO $Al_2O_3$ assuredly present around $ZrO_2$ particles of the tetragonal system dispersed in the sintered body, according to a preferred embodiment of the present invention, $ZrO_2$ of the cubic system containing MgO in the form of a solid solution is used as the starting $ZrO_2$. As the sintering is advanced, the MgO component migrates outside the particles of this $ZrO_2$ of the cubic system, and as the MgO concentration in the particles thus decreases, $ZrO_2$ is transformed to a tetragonal crystal from the cubic crystal, while the MgO component migrating from the particles reacts with alumina to form a spinel of MgO Al$_2$O$_3$.

Therefore, according to the present invention, the bonding among particles is strengthened, and when the surface of the sintered body is polished, falling of particles is not caused and an excellent surface smoothness can be attained. Furthermore, the ceramic sintered body of the present invention has a high abrasion resistance inherent to the Al$_2$O$_3$/TiC ceramic sintered body, and since ZrO$_2$ is dispersed in the ceramic sintered body, the chipping resistance and machinability are advantageously improved. Moreover, since the ceramic sintered body of the present invention does not contain a rare earth element component such as yttria, the manufacturing cost can be reduced. This is another advantage attained by the present invention.

In a preferred embodiment of the present invention, a part of TiC used at the step of mixing the starting materials is substituted by TiO$_2$, whereby the surface smoothness of the obtained ceramic sintered body is prominently improved. Furthermore, ZrO$_2$ of the tetragonal system is contained and magnesium oxide (MgO) is added and reacted with alumina, whereby a crystal phase of the composite oxide is formed, and the chipping resistance and machinability are prominently improved.

With reference to the Al$_2$O$_3$/TiC main constituent, the mixing ratio of both the components is set so that the amount of Al$_2$O$_3$ is 60 to 80% by weight, preferably 65 to 75% by weight, and the amount of TiC (or a titanium compound formed by combining TiC with TiO$_2$) is 20 to 40% by weight, preferably 25 to 35% by weight, and if the mixing ratio is thus set, a good sintered state can be obtained and excellent characteristics such as high abrasion resistance, good machinability and high strength can be attained.

When a part of the starting TiC is substituted by TiO$_2$ and the TiC/TiO$_2$ starting material is used in preparing this Al$_2$O$_3$/TiC ceramic sintered body, free carbon contained in the starting TiC reacts with TiO$_2$, whereby the crystallization degree is improved and the sintering property is increased, with the result that a homogeneous and densified sintered body is obtained and the surface smoothness is improved.

Moreover, TiO$_2$ is formed into a solid solution on the surfaces of TiC particles and Al$_2$O$_3$ particles, and the intermolecular bonding between TiC crystal grains and TiC crystal grains or between TiC crystal grains and Al$_2$O$_3$ crystal grains is further strengthened, and therefore, falling of grains is prevented even when the surface of the sintered body is polished, with the result that an excellent surface smoothness can be obtained.

If a part of the starting TiC is substituted by TiO$_2$, the surface smoothness is improved for the above-mentioned two reasons. For this purpose, the amount of the starting TiO$_2$ is set at 8 to 20% by weight, preferably 10 to 15% by weight, based on the sum of TiC and TiO$_2$. Incidentally, it must be noted that the incorporated TiO$_2$ is bonded to free carbon at the sintering step and it sometimes happens that TiO$_2$ is not present in the sintered body.

If TiO$_2$ is incorporated in the starting TiC in the above-mentioned manner, the surface smoothness is improved, but the chipping resistance and machinability tend to degrade. In order to eliminate this defect, ZrO$_2$ particles of the tetragonal system are dispersed in the interior of the sintered body, and moreover, a crystal phase of a composite oxide is formed from MgO and Al$_2$O$_3$ and this crystal phase is dispersed in the interior of the sintered body.

The ZrO$_2$ particles are incorporated in an amount of 1 to 10 parts by weight or from in excess of 2.0 parts, or 3 to 10 parts, 4.5 to 10 parts, or 7 to 10 parts of ZrO$_2$, preferably 3 to 6 parts by weight, per 100 parts by weight of the Al$_2$O$_3$/TiC main constituent. If the amount incorporated of ZrO$_2$ particles is smaller than 1 part by weight, the improvement of the chipping resistance cannot be expected, and if the amount of ZrO$_2$ particles is larger than 10 parts by weight, the toughness is degraded.

It is preferred that the particle size of ZrO$_2$ particles be reduced when the particles are incorporated, and the particles be uniformly dispersed in the interior of the sintered body, whereby the sintered body is further toughened. Namely, it is preferred that the average particle size of the ZrO$_2$ particles in the interior of the sintered body be smaller than 2 μm, especially smaller than 1 μm. If the particle size is within this range, the sintered body is toughened and the chipping resistance at the slicing step is improved.

It is indispensable that at least a part of the ZrO$_2$ particles in the sintered body should be composed of a tetragonal crystal, and because of this feature, the chipping resistance is improved. However, the ZrO$_2$ particles can contain a small amount of ZrO$_2$ particles composed of a cubic crystal or monoclinic crystal in addition to the ZrO$_2$ particles of the tetragonal system.

From the results of various experiments made by us, it was confirmed that it is preferred that the amount of the tetragonal crystal of ZrO$_2$ be at least 50 mole %, especially at least 70 mole %, based on the total ZrO$_2$. Because of this feature, the chipping resistance is prominently improved.

For dispersing the above-mentioned ZrO$_2$ particles of the tetragonal system in the interior of the sintered body, a ZrO$_2$ starting material having a stabilizer solid-dissolved therein is used at the step of forming the starting mixture, or a staring ZrO$_2$ material free of a stabilizer can also be used if it is composed of a tetragonal crystal.

In the case where the starting ZrO material having a stabilizer solid-dissolved therein is used, there can be attained an advantage in that at least 70 mole % of the entire ZrO$_2$ is readily formed into a tetragonal crystal. Furthermore, in this case, the ceramic sintered body of the present invention can be obtained irrespectively of whether the crystal state of ZrO$_2$ is monoclinic, tetragonal or cubic. In general, a part of the stabilizer in the starting zirconia tends to migrate out of the ZrO$_2$ particles with advance of the sintering, and it sometimes happens that the crystal phase of the ZrO$_2$ particles is changed. For example, in the case where ZrO composed mainly of a cubic crystal is used as the starting ZrO$_2$, a part of the stabilizer comes out of the ZrO$_2$ particles and enters into the interior of the sintered body, and therefore, the cubic crystal is transformed to a tetragonal crystal. As the stabilizer, there can be mentioned MgO, Y$_2$O$_3$ and CaO.

According to a preferred embodiment of the present invention, ZrO$_2$ of the cubic system having MgO as the stabilizer solid-dissolved therein is used as the starting ZrO$_2$ from the viewpoint of the surface smoothness. It is preferred that the content of MgO in the starting ZrO$_2$ be 5 to 18 mole %, especially 8 to 15 mole %.

In the present invention, an additional amount of the MgO component is incorporated in addition to MgO present in the starting $ZrO_2$ particles and this MgO is reacted with $Al_2O_3$ to form a predetermined amount of a crystal phase of a composite oxide. This crystal phase of the composite corresponds to the spinel having a composition of $MgO \cdot Al_2O_3$.

This crystal phase of the composite oxide is mainly present in the grain boundary of the sintered body to promote the toughening effect by the $ZrO_2$ particles, whereby the chipping resistance and machinability are improved. The content of the crystal phase of the composite oxide is 0.4 to 11% by weight, preferably 1 to 10% by weight, especially preferably 2.5 to 7% by weight, based on the entire sintered body. If the content of the crystal phase of the composite oxide is lower than 0.4% by weight, the chipping resistance is degraded, and if the content of the crystal phase of the composite oxide is higher than 11% by weight, abnormal growth of grains is caused and the crystal texture becomes heterogeneous.

As the material used for forming the crystal phase of the composite oxide, there can be mentioned not only MgO but also compounds that can be converted to MgO at the sintering step, such as $Mg(OH)_2$, $MgCO_3$ and $Mg_3N_2$. The amount of the starting MgO material is determined so that the crystal phase of the composite oxide is formed in an amount of at least 0.4% by weight in the sintered body. Namely, the MgO material is incorporated in an amount of 0.5 to 6 parts by weight, preferably 1 to 4 parts by weight, par 100 parts by weight of the main $Al_2O_3$/TiC constituent. If the amount of the MgO material is smaller than 0.5 part by weight, since the amount formed of the crystal phase of the composite oxide is too small, the chipping resistance is degraded. If the amount of the MgO material exceeds 6 parts by weight, abnormal growth of grains is caused in the interior of the texture.

As pointed out hereinbefore, the present invention is characterized in that $ZrO_2$ particles, at least a part of which is of the tetragonal system, and the crystal phase of the composite oxide are contained. In order to realize this characteristic feature, it is preferred that the stabilizer (MgO) contained in the starting $ZrO_2$ is caused to make a contribution to formation of the crystal phase of the composite oxide.

More specifically, in the case where the starting $ZrO_2$ having the stabilizer solid-dissolved therein is used, the stabilizer is diffused in the main $Al_2O_3$/TiC constituent from the starting $ZrO_2$ with advance of the sintering and is reacted with $Al_2O_3$ to form the crystal phase of the composite oxide. With formation of this crystal phase, the $ZrO_2$ particles are tightly bonded to the main $Al_2O_3$/TiC constituent through the crystal phase of the composite oxide, whereby falling of the $ZrO_2$ particles is prevented and an excellent surface smoothness is obtained, and the chipping resistance and machinability are further improved.

From the results of various experiments made by us, it was confirmed that in the case where the crystal phase of the composite oxide is formed by using only the stabilizer diffused form the $ZrO_2$ particles and MgO is not particularly added at the step of mixing the starting materials, it is difficult to form the crystal phase of the composite oxide in an amount of at least 0.4% by weight. Accordingly, it is important that an additional amount of the MgO component should be incorporated.

In the present invention, it is preferred that starting materials having a high purity be used. More specifically, it is preferred that starting $Al_2O_3$ having a purity of at least 99.9%, starting TiC having a purity of at least 99.5% and $TiO_2$ and MgO having a purity higher than that of the first class reagent be used.

According to the present invention, the above-mentioned components are uniformly and homogeneously mixed. As the mixing means, there can be mentioned the dry mixing method and the wet mixing step, but the wet mixing method is preferred because uniform mixing is easily attained. According to a preferred embodiment of the present invention, the components other than $ZrO_2$ are mixed under pulverization by using a pulverizing medium (balls) formed of $ZrO_2$ of the cubic system, whereby the fine $ZrO_2$ component is uniformly incorporated in the mixture from the balls.

The composition mixed by pulverization is molded in a predetermined shape such as a plate, a disk, a column or a square pillar, and the shaped composition is then sintered.

As the sintering method, there can be adopted the hot press method, the HIP method, a combination of the hot press method and the HIP method and a combination of the preliminary sintering and the HIP method. The sintering temperature is generally 1600° to 1800° C. and preferably 1650° to 1750° C. It is preferred that the sintering be carried out under a pressure of 150 to 350 kg/cm$^2$ gauge, especially 200 to 300 kg/cm$^2$ gauge.

The specific gravity of the ceramic sintered body obtained by the above-mentioned sintered body is at least 99.2%, preferably at least 99.6%, of the true specific gravity, and therefore, the ceramic sintered body comes to have a texture having a highest density, with the result that excellent surface smoothness, machinability and chipping resistance can be obtained.

The ceramic sintered body of the present invention comprises $Al_2O_3$, TiC, $ZrO_2$ and the above-mentioned composite oxide as indispensable components, but incorporation of other components is not excluded in the present invention. For example, if a pulverizing medium of balls other than $ZrO_2$ balls is used at the mixing and pulverizing step, the component constituting the pulverizing medium is inevitably included during the mixing and pulverizing step. For example, oxides, carbides and nitrides of Si, W, Nb, Mn and Hf can be mentioned. Such a component may be incorporated in an amount of up to 1% by weight.

According to the present invention, by incorporating $TiO_2$ into the starting material in forming the main $Al_2O_3$/TiC constituent, the surface smoothness is prominently improved. Morover, by uniformly dispersing $ZrO_2$ particles of the tetragonal system and forming the crystal phase of the composite oxide in the interior of the sintered body, a ceramic sintered body which is improved in the chipping resistance and machinability as well as the surface smoothness can be provided.

The present invention will now be described in detail with reference to the following examples that by no means limit the scope of the invention.

EXAMPLE 1

Starting $Al_2O_3$ (having a purity of 99.9%), starting TiC (having a purity of 99.5%), starting $TiO_2$ (having a purity of 99.9%) and starting $Mg(OH)_2$ (having a purity of 99.9%) were mixed at a ratio shown in Table 1, and the composition was pulverized and blended according to the wet method using $ZrO_2$ balls (composed mainly of a cubic crystal and having 10 mole% of MgO solid-dissolved therein). Then, $ZrO_2$ was added in an amount shown in Table 1 and the mixture was molded. The molded body was hot-press-sintered for 1 hour at a temperature of 1700° C. under a pressure of 250 kg/cm². In this manner, 14 kinds of disk-shaped ceramic sintered bodies (having a diameter of 76 mm and a thickness of 5 mm) having a specific gravity corresponding to at least 99.2% of the true specific gravity were obtained.

With respect to each of the obtained samples, the chipping resistance, machinability and surface smoothness, the crystal state of ZrO₂ particles and the content of the crystal phase of the composite oxide were determined. The obtained results are shown in Table 1.

The chipping resistance was evaluated in the following manner. Each sample was cut into a strip having a size of 21 mm×4 mm×3 mm, and the sample was subjected to lapping to form a mirror surface. Then, the sample was cut by using a diamond wheel (resin #325, diameter=110 mm, thickness×1 mm) at a rotation rate of 5500 rpm and a feed rate of 40 mm/min. The chipping state on the cut face was examined.

FIG. 1 shows this cut face. In FIG. 1, reference numeral 1 represents the sample, reference numeral 2 represents the cut face of the sample, and reference 3 represents the passing interface of the diamond wheel. The portion between the cut face 2 and the interface 3 was the portion removed by chipping. At the present test, optional points A and B were set at an interval of 500 $\mu$m in the interface 2. In the region between the points A and B, the maximum chipping width and four larger chipping widths coming next to the maximum chipping width were selected, and the chipping resistance was evaluated based on the mean value of these five chipping widths. Namely, when the mean value of the chipping widths was large, it was judged that the chipping resistance was poor.

In Table 1, the chipping resistance is indicated by marks "⊙", "○", "Δ" and "X", and mark "⊙" indicates the mean chipping width smaller than 20 $\mu$m, mark "○" indicates the mean chipping width not smaller than 20 $\mu$m but smaller than 25 $\mu$m, mark "Δ" indicates the mean chipping width not smaller than 25 $\mu$m but smaller than 30 $\mu$m, and mark "X" indicates the mean chipping width not smaller than 30 $\mu$m.

The machinability was evaluated in the following manner. The above-mentioned disk-shaped ceramic sintered body was polished into a disk having a diameter of 76 mm and a thickness of 4 mm, and the disk was cut by using a diamond wheel (resin #325, diameter=110 mm, thickness=1 mm) at a rotation rate of 5500 rpm and a feed rate of 100 mm/min. At this cutting operation, the load current of a rotating and driving motor connected to the main shaft of the diamond wheel was measured and the mean current value at the normal cutting was determined. As the mean current value increases, the cutting resistance increases and the machinability is reduced. In Table 1, the machinability is indicated by three marks "○", "Δ" and "X". Namely the machinability is higher in the order of "○", "Δ" and "X".

The surface smoothness was evaluated in the following manner. The surface of the disk-shaped ceramic sintered body was mirror-polished by using a #450 diamond grindstone, and the surface was subjected to lapping under a pressure of 115 g/cm². This lapping operation comprised the following steps A and B conducted in sequence. The lapping conditions adopted at the respective steps were as follows.

Step A lapping machine: cast iron
abrasive: diamond abrasive grain (grain size=4 to 8 $\mu$m)+water
rotation speed: 30 rpm
grinding time: 60 minutes Step B lapping machine: tin
abrasive: diamond abrasive grain (grain size=0 to 3 $\mu$m)+water
rotation speed: 30 rpm
grinding time: 75 minutes The mirror-polished surface was observed by using a metal microscope (400 magnifications) to evaluate the surface smoothness with the eye. In Table 1, the surface smoothness is indicated by marks "⊙", "○", "Δ" and "X". Mark "⊙" indicates that falling of grains or formation of voids was not observed, mark "○" indicates that falling of grains having a diameter smaller than 1 $\mu$m or formation of voids having a diameter smaller than 1 $\mu$m was observed, mark "Δ" indicates that falling of grains having a diameter of 1 to 2 $\mu$m or formation of voids having a diameter of 1 to 2 $\mu$m was observed, and mark "X" indicates that falling of grains having a diameter larger than 2 $\mu$m or formation of voids having a diameter larger than 2 $\mu$m was observed.

The crystal state of the ZrO₂ particles was measured by an X-ray diffraction apparatus, and the main crystal phase and the content of the sum of the cubic crystal and tetragonal crystal based on the entire ZrO₂ were determined.

The content of the crystal phase of the composite oxide was determined according to the reference intensity ratio method using an X-ray diffraction apparatus (Model JDX-10RA supplied by Nippon Denshi). The measurement conditions were as shown below.

Measurement Conditions voltage: 40 KV
current: 150 mA
mode: stepped scanning
measurement time: 1.0 second
target: Cu
wavelength: 1.5418 Å
start: 27°
stop: 39°

The content Xi (% by weight) of the composite oxide crystal phase 1 was determined according to the following calculation formula:

$$Xi = \frac{1}{ki} \times \frac{Ii}{Ir} \times Xr$$

where Xr stands for the content of the crystal phase of the selected reference substance (Y₂O₃), Ii stands for the X-ray diffraction intensity of the crystal phase i, Ir stands for the X-ray diffraction intensity of the reference substance, and ki stands for the reference intensity ratio (the ratio of the intensity of the composite oxide crystal phase to the intensity of Y₂O₃ observed when the composite oxide crystal phase and Y₂O₃ are mixed at a ratio of 1/1).

When respect to each sample, the measurement was conducted three times under the above-mentioned measurement conditions according to the above-mentioned calculation formula. The mean value is shown as the content of the crystal phase of the composition oxide in Table 1.

TABLE 1

| Sample No. | Mixing Ratio of Starting Material | | | | | |
|---|---|---|---|---|---|---|
| | starting materials of main constituents (% by weight) | | | | amount (parts by weight) per 100 parts by weight of starting materials of main constituents | |
| | $Al_2O_3$ | TiC | $TiO_2$ | $TiO_2/(TiC + TiO_2)$ (% by weight) | $ZrO_2$ | MgO*** |
| 1* | 67.5 | 28.9 | 3.6 | 11 | 0.5 | 1.5 |
| 2 | 67.5 | 28.9 | 3.6 | 11 | 1.5 | 1.5 |
| 3 | 67.5 | 28.9 | 3.6 | 11 | 4.5 | 1.5 |
| 4 | 67.5 | 28.9 | 3.6 | 11 | 8 | 1.5 |
| 5* | 67.5 | 28.9 | 3.6 | 11 | 12 | 1.5 |
| 6* | 67.5 | 28.9 | 3.6 | 11 | 4.5 | — |
| 7* | 67.5 | 28.9 | 3.6 | 11 | 4.5 | 0.25 |
| 8 | 67.5 | 28.9 | 3.6 | 11 | 4.5 | 1.0 |
| 9 | 67.5 | 28.9 | 3.6 | 11 | 4.5 | 4 |
| 10* | 67.5 | 28.9 | 3.6 | 11 | 4.5 | 8 |
| 11 | 68.1 | 29.2 | 2.7 | 8.5 | 4.5 | 1.5 |
| 12* | 68.9 | 29.5 | 1.6 | 5 | 4.5 | 1.5 |
| 13* | 64.5 | 27.7 | 7.8 | 22 | 4.5 | 1.5 |
| 14* | 70 | 30 | — | — | 4.5 | 1.5 |

| Sample No. | Crystal State of $ZrO_2$ Particles** | | Content (% by weight) of Composite Oxide Crystal Phase | Characteristics | | |
|---|---|---|---|---|---|---|
| | main crystal phase | ratio (mole %) based on sum of c + t | | chipping resistance | machinability | surface smoothness |
| 1* | m + t | 80 | 2.7 | X | ◯ | ◎ |
| 2 | m + t | 80 | 2.7 | ◯ | ◯ | ◎ |
| 3 | m + t | 75 | 2.9 | ◎ | ◯ | ◎ |
| 4 | m + t + c | 56 | 3.0 | ◎ | ◯ | ◎ |
| 5* | m + t + c | 35 | 3.2 | ◎ | ◯ | ◯ |
| 6* | m + t | 75 | below 0.3 | X | X | ◎ |
| 7* | m + t | 75 | below 0.3 | Δ | Δ | ◎ |
| 8 | m + t | 75 | 2.2 | ◯ | ◯ | ◎ |
| 9 | m + t | 75 | 7.5 | ◎ | ◯ | ◎ |
| 10* | m + t | 75 | 14.8 | ◎ | ◯ | ◎ |
| 11 | m + t | 75 | 2.9 | ◎ | ◯ | ◯ |
| 12* | m + t | 75 | 2.9 | ◎ | ◯ | Δ |
| 13* | m + t | 75 | 2.7 | ◎ | ◯ | X |
| 14* | m + t | 75 | 2.9 | ◎ | ◯ | X |

*outside the scope of the present invention
**c = cubic system, t = tetragonal system, m = monoclinic system
***the mixing ratio calculated as MgO As is apparent from Table 1, sample Nos. 2, 3, 4, 8, 9 and 11 according to the present invention were excellent in the chipping resistance and machinability, and falling of grains or formation of voids was not observed and the surface smoothness was very good.

In sample No. 1, the chipping resistance was poor because the amount incorporated of $ZrO_2$ was too small. In sample No. 5, the toughness was degraded because the amount incorporated $ZrO_2$ was too large. Accordingly, these samples were not practically used.

In sample Nos. 6 and 7, the chipping resistance and machinability were poor because MgO was not added or MgO was added in a very small amount. In contrast, in sample No. 10 where MgO was incorporated in too large an amount, the amount formed of the crystal phase of the composite oxide became too large, and therefore, abnormal growth of grains was caused and the texture became heterogeneous, with the result that reduction of the strength and hardness was observed.

In sample No. 12, the amount incorporated of $TiO_2$ was too small, and therefore, no improvement of the surface smoothness was attained. In sample No. 14 where $TiO_2$ was not incorporated at all, falling of grains was conspicuous. In sample No. 13, formation of voids was observed because the amount added of $TiO_2$ was too large.

EXAMPLE 2

With respect to each of sample Nos. 3, 11, 12 and 14 shown in Table 1, the crystallization degree of TiC was measured according to the X-ray diffractometry under the following conditions by using an X-ray diffraction apparatus (Model JDX-10RA supplied by Nippon Denshi).

Measurement Conditions voltage: 40 KV
current: 150 mA
step width: 0.01°
measurment time: 0.1 second
target: Cu
wavelength: 1.5418 Å
div. slit: 1.0°
rec. slit: 0.3 mm
scatt. slit: 1.0°

Figure 2:
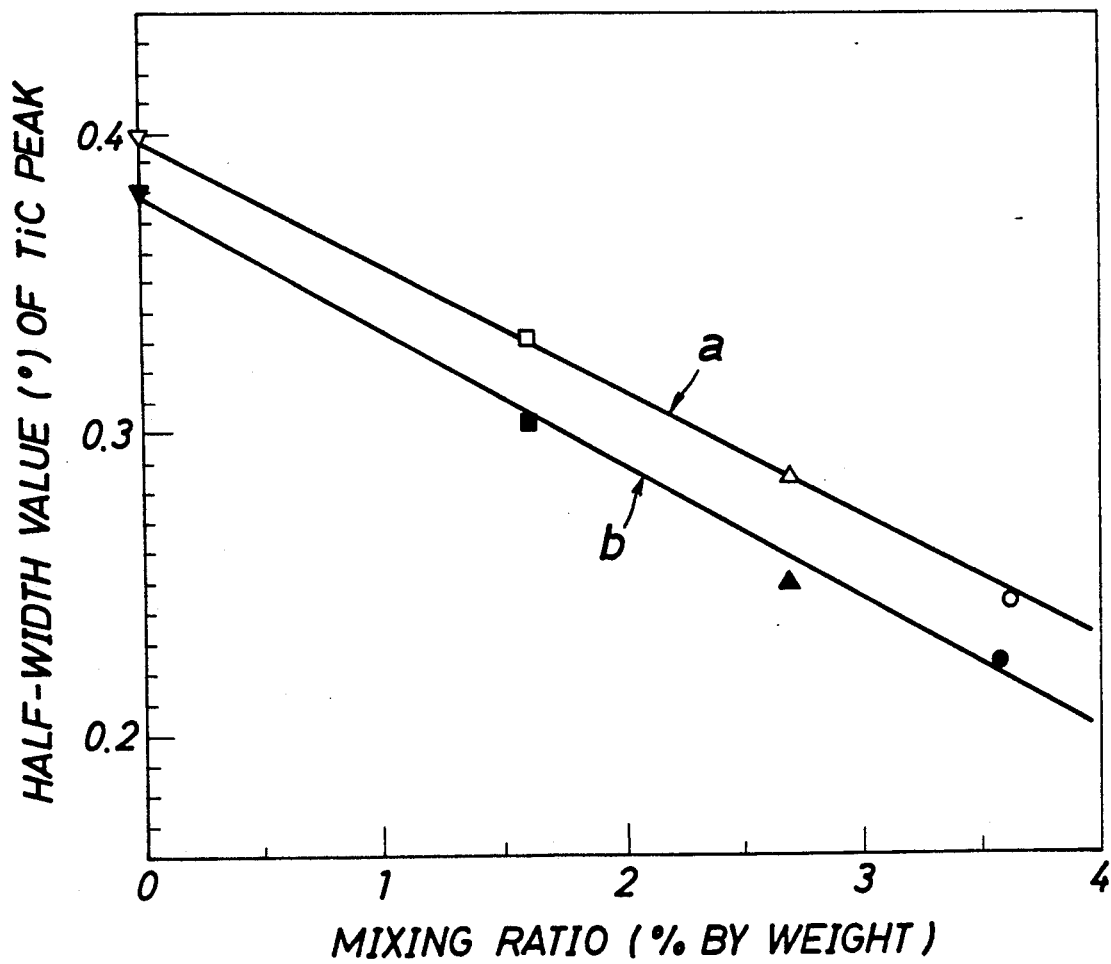
FIG. 2 is a graph illustrating the crystallization degree of TiC.

The measurement results are shown in FIG. 2, in which the mixing ratio (% by weight) of $TiO_2$ based on the starting materials of the main constituents is platted on the abscissa and the half-value width of the TiC peak is plotted on the ordinate. With respect to each sample, the half-value width of the peak at 41.8° or 36.0° was determined.

In case of the half-value width of the peak at 41.8°, marks "◯", "Δ", "□" and "∇" indicate the results of sample Nos. 3, 11, 12 and 14, respectively. In case of the half-value width of the peak at 36.0°, marks " ", " ", " " and " " indicate the results of sample Nos. 3, 11, 12 and 14, respectively. Incidentally, a and b are characteristic curves of peaks at 41.8° and 36.0°, respectively.

From the results shown in FIG. 2, it is seen that with increase of the amount incorporated of $TiO_2$, the half-value width is linearly reduced and the crystallization degree of TiC is improved.

If the mixing ratio of starting $TiO_2$ is higher than 2.5% by weight, that is, the ratio of $TiO_2$ to the sum of TiC and $TiO_2$ is higher than 8% by weight, the half-value width is smaller than 0.30° in case of the peak at 41.8° and the half-value width is smaller than 0.27° in case of the peak at 36.0°.

When MgO, $MgCO_3$ or $Mg_3N_2$ was used instead of $Mg(OH)_2$, it was confirmed that results similar to those obtained in the present example were obtained.

As is apparent from the foregoing description, the ceramic sintered body of the present invention has excellent chipping resistance and machinability, and therefore, when this ceramic sintered body is sliced and subjected to precision procession, the yield can be prominently increased.

Furthermore, the ceramic sintered body of the present invention has an excellent surface smoothness, and for example, if this sintered body is used as a substrate for a thin film head, a high smoothness is obtained by mirror-polishing the air bearing surface (ABS). Accordingly, even if severe mirror-polishing conditions are adopted so that the amount ground per unit time is increased, falling of grains is controlled and the mirror-polishing time is shortened, with the result that the manufacturing efficiency is increased and the manufacturing cost is reduced. Furthermore, there is attained an advantage in that head crash is not caused. Accordingly, the reliability of the substrate per se is highly improved.

Moreover, the ceramic sintered body of the present invention is excellent in the precision machinability, abrasion resistance, strength and slicing property. Accordingly, the ceramic sintered body of the present invention is recommended as a constituent material of a substrate for a magnetic disk or a tool for precision machining.

We claim:

1. A ceramic sintered body, consisting essentially of:
   (a) 60 to 80% by weight of alumina;
   (b) 20 to 40% by weight of titanium carbide or a combination of titanium carbide and titanium oxide;
   (c) 3 to 10 parts by weight, per 100 parts by weight of the sum of the components (a) and (b), of zirconium oxide, at least a part of which is composed of a tetragonal crystal; and
   (d) 0.4 to 11% by weight, based on the total ceramic sintered body, of a crystal phase of a composite oxide consisting of magnesium oxide and aluminum oxide.

2. A ceramic sintered body as set forth in claim 1, wherein at least 50 mole % of the zirconium oxide is present in the form of a tetragonal crystal.

3. A ceramic sintered body as set forth in claim 1, wherein the zirconium oxide is present in the form of particles having a particle size smaller than 2 μm the sintered body.

4. A ceramic sintered body as set forth in claim 1, wherein the crystal phase of the composite oxide is a spinel of $MgO \cdot Al_2O_3$.

5. A ceramic sintered body as set forth in claim 1, wherein the components (a) and (b) are present at an (a)/(b) weight ratio of from 65/35 to 75/25.

6. A ceramic sintered body as set forth in claim 1, wherein the component (b) comprises a combination of titanium carbide and titanium oxide and the titanium oxide is present in an amount of 8 to 20% by weight based on the sum of the titanium carbide and titanium oxide.

7. A ceramic sintered body as set forth in claim 1, which is obtained by molding a mixture comprising (a) alumina, (b) titanium carbide or a combination of titanium carbide and titanium oxide, (c') zirconium of the cubic system containing magnesium oxide in the form of a solid solution and (d') an additional amount of magnesium oxide or a compound capable of forming magnesium oxide under sintering conditions, and sintering the molded body.

8. A substrate for a thin film head, which is composed of a ceramic sintered body as set forth in claim 1.

9. A ceramic sintered body as set forth in claim 1, wherein the body consists essentially of 3 to 6 parts by weight of zirconium oxide, at least a part of which is composed of a tetragonal crystal, per 100 parts by weight of the sum of the components (a) and (b).

10. A ceramic sintered body, consisting of:
   (a) 60 to 80% by weight of alumina;
   (b) 20 to 40% by weight of titanium carbide or a combination of titanium carbide and titanium oxide, wherein the ceramic sintered body further comprises:
   (c) 3 to 10 parts by weight, per 100 parts by weight of the sum of the components (a) and (b), of zirconium oxide, at least a part of which is composed of a tetragonal crystal; and
   (d) 0.4 to 11% by weight, based on the total ceramic sintered body, of a crystal phase of a composite oxide consisting of magnesium oxide and aluminum oxide.

11. A ceramic sintered body, consisting essentially of:
   (a) 60 to 80% by weight of alumina;
   (b) 20 to 40% by weight of titanium carbide or a combination of titanium carbide and titanium oxide;
   (c) 4.5 to 10 parts by weight, per 100 parts by weight of the sum of the components (a) and (b), of zirconium oxide, at least a part of which is composed of a tetragonal crystal; and
   (d) 0.4 to 11% by weight, based on the total ceramic sintered body, of a crystal phase of a composite oxide consisting of magnesium oxide and aluminum oxide.

12. A ceramic sintered body, consisting essentially of:
   (a) 60 to 80% by weight of alumina;
   (b) 20 to 40% by weight of titanium carbide or a combination of titanium carbide and titanium oxide;
   (c) 7 to 10 parts by weight, per 100 parts by weight of the sum of the components (a) and (b), of zirconium oxide, at least a part of which is composed of a tetragonal crystal; and
   (d) 0.4 to 11% by weight, based on the total ceramic sintered body, of a crystal phase of a composite oxide consisting of magnesium oxide and aluminum oxide.

* * * * *